2,951,861
POLYESTER SYNTHETIC LUBRICANTS

Paul M. Kerschner, Pennsauken, and Bertrand W. Greenwald, Haddonfield, N.J., assignors to Cities Service Research and Development Company, New York, N.Y., a corporation of New Jersey No Drawing. Filed Nov. 27, 1957, Ser. No. 699,185

6 Claims. (Cl. 260—448.2)

This invention relates to a new class of compounds which are particularly suitable as synthetic lubricants because of their high flash and fire points and high viscosity indices. More particularly, this invention relates to new polyester compounds prepared by reacting a carbon functional siloxane dibasic acid with a diol and a silyl or siloxane alcohol.

In the lubricating art, substantial progress has been made in the production of lubricants characterized by properties which make them particularly adapted for use at high temperatures such as in the lubricating of jet engines. The progress in providing lubricating products to meet the increasingly vigorous requirements has been made possible by improved production methods and in the creation of new materials having high viscosity indices and low pour and high fire points. The new compounds of the present invention possess such characteristics and are of particular value in the lubrication of engines such as the prop jet engines and straight turbine engines. A portion of the requirements of engines of this type can be met by mineral oil lubricants containing viscosity improvers, stabilizers, thickeners, and other additives which improve the natural properties and characteristics considerably. However, the use of such additives at the temperatures at which the compounds of the present invention are required to operate are often detrimental and undesirable.

Accordingly, compounds of the type of the present invention have been developed which are particularly suited for lubricating under the conditions suggested above. The new compounds of the present invention are prepared by reacting a carbon functional siloxane dibasic acid with a diol, with the ester product resulting thereafter being esterified with a chain terminating silyl or siloxane alcohol. In carrying out the reaction, one mol of the diacid is generally reacted with 0.5 mol diol, with the product resulting being treated with an additional mol of a simple silyl or siloxane alcohol. The polyester product is obtained by removing molar amounts of water in effecting esterification, with the reaction generally being carried out in the presence of esterification catalyst such as p-toluene sulfonic acid.

The new compounds of the present invention may be broadly defined by the folowing formula $$R-O-\left[\overset{O}{\underset{\|}{C}}-R_1-\overset{O}{\underset{\|}{C}}-O-R_2-O-\right]_z\overset{O}{\underset{\|}{C}}-R_1-\overset{O}{\underset{\|}{C}}-O-R$$

wherein R is selected from the group consisting of

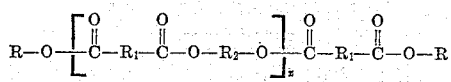

and $(CH_3)_3Si-(CH_2)_a-$ wherein $a$ is 1 or a number from 3 to 8; $R_1$ is

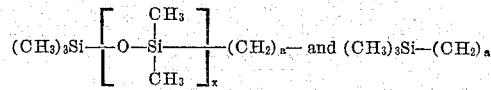

$R_2$ is a divalent hydrocarbon radical having from 2 to 18 carbon atoms; and $z$ is a number from 1 to 6, $x$ is a number from 1 to 6, and $n$ is a number from 2 to 7.

In the foregoing general structure, the group identified as $R_2$, the divalent hydrocarbon radical having from 2 to 18 carbon atoms, represents the residue of the dialcohol reacted with the diacid, the residue of which is identified as $R_1$. In carrying out the reaction of the diacid and diol, any suitable diol having from 2 to 18 carbon atoms can be used, including such diols as ethylene glycol, propylene glycol, butylene glycol, trimethylene glycol, tetramethylene glycol, and pentamethylene glycol. In addition, glycols such as diethylene glycol, triethylene glycol, and other polyethylene glycols can be used. Glycols containing sulfur atoms in thioether linkages may also be employed if desired. Diols containing hydroxy groups at other than terminal positions such as the 1-2 n-propane diol and 1-3 n-butane diol may also be used.

The carbon functional siloxane dibasic acid employed in the preparation of these new compounds, the residue of which is identified in the foregoing structure as $R_1$, is known to those skilled in the art. One method of preparing these acids is to subject a chlorinated alkyl disiloxane to a malonic ester synthesis, and thereafter subject the product of the malonic ester synthesis to hydrolysis and decarboxylation. The carbon functional organo siloxane dibasic acid obtained will include the polysiloxane structure when a chlorinated alkyl polysiloxane is subjected to the malonic ester synthesis. A more complete description of these particular acids and their manner of preparation is found in J.A.C.S. 78, 2010 (1956).

The monohydric terminating compound used in preparing these new polyesters, as has been previously indicated, is either a silyl alcohol or siloxane alcohol. The silyl alcohol is identified as one having the structure $$(R)_3-Si-(CH_2)_a-OH$$

in which R represents a low molecular weight alkyl group, preferably ethyl or methyl, and $a$ is 1 or a number from 3 to 8. The chain represented as "$-(CH_2)_a-$" does not include the number 2 since it has been found that such a product is unstable and will not produce a stable ester according to the method by which the compounds of the present invention are prepared.

The alternative to the use of such a silyl alcohol is to use a monohydric siloxane compound having the structure

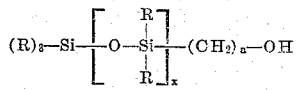

in which R represents a low molecular weight alkyl group, preferably methyl or ethyl, $x$ represents an integer from 1 to 6, and $a$ is 1 or a number from 3 to 8.

The new compounds of the present invention prepared according to the foregoing reaction may generally be characterized as oily in appearance, having a light yellow color and high stability to oxidation. They are of high viscosity index, possess high flash and fire points, evaporate at a very low rate, and are generally soluble in oil and insoluble in water.

The new compounds of the present invention may be prepared either in a single step reaction or in a two-stage reaction, with the latter method being preferred. When a one-step method of preparation is used, all the reactants, i.e., the diacid, diol, and monohydric silyl or siloxane terminator, are mixed in a single reaction vessel and heat applied until completion of esterification. As indicated for purposes of the present invention, a two-step preparation is preferred in which the selected carbon functional siloxane dibasic acid is first esterified with a diol of the type previously mentioned. The preferred molar ratio of dibasic acid to diol varies from 2:1 to about 1.25:1. If molar ratios of less than 1.25:1 (such as 1.1:1 or 1:1) are used, a very high molecular weight, viscous oil results. This tendency can be overcome if a large excess of monoalcohol is used as the esterification chain terminator. During esterification, to facilitate removal of water from the reactant mixture, an azeotrope forming solvent such as benzene, xylene or toluene is generally employed. Other suitable low boiling azeotrope forming solvents may also be used.

The reactant mixture is refluxed for a period of time, generally from 1 to about 8 hours, at the azeotrope reflux temperature until the theoretical amount of water, indicating completion of the esterification reaction, is recovered. Suitable apparatus for effecting this reaction may include a three-necked round bottom flask provided with a mechanical stirrer, a reflux condenser fitted with a water trap, and a thermometer. After completion of the initial esterification reaction, and equimolar amount of the chain terminating esterifying monohydric silyl or siloxane compound is added and reflux again conducted until completion of esterification as is indicated by recovery of the theoretical amount of water. At this time, excess reactants and azeotrope solvent are removed from the reaction zone by distillation, with the polyester product being recovered after washing and neutralization by distillation at a reduced pressure.

A more complete understanding of these new compounds and their manner of preparation may be obtained from the following examples:

EXAMPLE 1

To 19.5 grams (0.07 mol) of 4,4,6,6 tetramethyl 4,6 disila 5 oxa nonanedioic acid, 3.2 grams (0.035 mol) of 1,3 butanediol is added in a 500 ml., three-neck, round bottom flask provided with a mechanical stirrer, a reflux condenser fitted with a water trap, and a thermometer. To the reactant mixture, 0.05 gram of p-toluene sulfonic acid catalyst is added, together with 112 grams of toluene. The reactant mixture is refluxed at a temperature of about 110° C. for 4 hours. At the end of this time, approximately 1.0 cc. of water will have been recovered, indicating substantially complete esterification of the acid.

To the reactant mixture, 10.2 grams (0.07 mol) of 4 hydroxy butyl 1-trimethylsilane is aded, and reflux again carried out at a temperature of 110° C. for 8 additional hours. After esterification is complete, toluene and unreacted chain stopper are removed from the reaction zone by distillation at atmospheric pressure. The crude product is then washed with water, followed by a washing with 10% sodium carbonate, and again washed with water to remove residual acidity. Remaining unreacted alcohol, water and solvent can then be removed by distilling at a temperature of about 113° C. at 4 mm. Hg. The desired polyester product is then obtained by filtration. The properties and characteristics of the product prepared in accordance with this example are shown in Table I.

EXAMPLE 2

Following the procedure set forth in Example 1 above, 58.0 grams (0.2 mol) of 4,4,6,6 tetramethyl 4,6 disila 5 oxa nonanedioic acid is reacted with 6.2 grams (0.10 mol) of ethylene glycol. To this mixture 0.58 gram of p-toluene sulfonic acid catalyst is added, together with 175 grams of toluene solvent. After esterification of the acid is substantially completed, as will be indicated by recovery of the theoretical amount of water of esterification, 29.2 grams (0.20 mol) of 4-hydroxybutyl 1-trimethylsilane are added to the reaction mixture. Reflux is again conducted until the theoretical amount of water is recovered. The resulting product is treated in the manner described above.

EXAMPLE 3

According to the method of Example 1, 58.0 grams (0.2 mol) of 4,4,6,6 tetramethyl 4,6 disila 5 oxa nonanedioic acid is reacted with 8.3 grams (0.133 mol) of ethylene glycol in the presence of 0.58 gram of p-toluene sulfonic acid catalyst and 175 grams of toluene solvent. After esterification of the acid is substantially complete, 19.4 grams (0.133 mol) of 4-hydroxyl butyl 1-trimethylsilane is added to the reaction mixture and reflux continued until esterification is complete. The product is then treated in the manner previously described.

EXAMPLE 4

58.0 grams (0.2 mol) of 4,4,6,6 tetramethyl 4,6 disila 5 oxa nonanedioic acid are reacted with 10.6 grams (0.1 mol) of diethylene glycol in the presence of 0.58 gram of p-toluene sulfonic acid catalyst and 175 grams of toluene solvent. After esterification of the acid, 32.0 grams (0.20 mol) of 5 hydroxyamyl 1-trimethylsilane is added as a chain stopper to the reaction mixture. The final product possesses properties and characteristics generally similar to those defined for the product of Example 1.

EXAMPLE 5

Following the method of the foregoing examples, 58.0 grams (0.2 mol) of 4,4,6,6 tetramethyl 4,6 disila 5 oxa nonanedioic acid is reacted with 10.4 grams (0.1 mol) of 1,5 pentanediol in the presence of acid and azeotrope solvent. To the ester product resulting, 29.2 grams (0.2 mol) of 4-hydroxybutyl 1-trimethylsilane is added, with esterification then being conducted substantially to completion. The product resulting will possess the characteristics similar to those previously outlined above.

EXAMPLE 6

58.0 grams (0.2 mol) of 4,4,6,6 tetramethyl 4,6 disila 5 oxa nonanedioic acid are reacted with 10.4 grams (0.1 mol) of 1,5 pentanediol in the presence of catalyst and toluene solvent. Chain termination is accomplished by adding 29.2 grams (0.20) of 4-hydroxybutyl 1-trimethylsilane to the reaction mixture.

EXAMPLE 7

To 58.0 grams (0.2 mol) of 4,4,6,6 tetramethyl 4,6 disila 5 oxa nonanedioic acid, 10.6 grams (0.1 mol) of diethylene glycol is added. After esterification is conducted according to the method described in Example 1, 41.2 grams (0.2 mol) of 3-hydroxypropyl 1-pentamethyl disiloxane is added and reflux again conducted until esterification is substantially complete. The polyester product is recovered according to the method previously described.

EXAMPLE 8

Following the procedure set forth in the foregoing examples, 70.4 grams of 4,4,6,6,8,8 hexamethyl 4,6,8 trisila 5,7 oxa undecanedioic acid is esterified with 10.6 grams of diethylene glycol. To the product resulting from the esterification of these compounds, 41.2 grams of 3-hydroxypropyl 1-pentamethyl disiloxane is added, with the polyester product resulting being recovered according to the method described above.

EXAMPLE 9

10.6 grams of diethylene glycol and 70.4 grams of 4,4,6,6,8,8 hexamethyl 4,6,8 trisila 5,7 oxa undecanedioic acid are esterified, with the product being reacted with 44 grams of 4-hydroxybutyl 1-pentamethyl disiloxane.

EXAMPLE 10

Following the method of the previous examples, 85.2 grams of 4,4,6,6,8,8,10,10 octamethyl 4,6,8,10 tetrasila 5,7,9 trioxa tridecanedioic acid is esterified with 12 grams of propylene glycol according to the method set forth in Example 1. The product resulting is reacted with 46.8 grams of 5 hydroxy pentyl 1 pentamethyl disiloxane, with the final product resulting being recovered according to the method of Example 1.

Representative of the new compounds of the present invention having properties and characteristics making them suitable as lubricants and hydraulic fluids is the polyester prepared according to Example 1. The properties of this compound are as follows:

Table I

| | |
|---|---|
| Refractive index, $n^{25°}$ | 1.4511 |
| Density$_{25}$ | 1.0484 |
| Vis. at 100° F., cs | 30.61 |
| Vis. at 210° F., cs | 7.25 |
| Viscosity index | 167 |
| Pour point, °F | <−60 |
| Saponification No. (found) | 250 |
| Saponification No. (theoretical) | 258 |
| Molecular weight (found) | 779 |
| Molecular weight (theoretical) | 866 |
| Percent silica (found) | 20.3 |
| Percent silica (theoretical) | 19.3 |
| Flash point, °F | >400 |
| Evap. loss, percent, at 400° F | <10 |

A comparison of the characteristics of the foregoing compound with a typical synthetic lubricant specification will indicate the general suitability of these compounds for lubricating purposes. Typical of the specifications set up by the Armed Services for synthetic lubricants is the Air Force Specification Mil. L-7808 which requires the following:

| | |
|---|---|
| Vis. at 210° F., cs. | 3.0 min. |
| Vis. at −65°, cs. | 13,000 max. |
| Pour point, ° F. | −75 max. |
| Flash point, ° F. | 400 min. |
| Evap. loss, percent, at 400° F. | 35 max. |
| Ryder gear scuff load, lbs./sq. in. | 1870 min. |

When utilized for lubricating purposes under conditions less stringent than those set forth in the foregoing specification, such as, for example, the specifications of ordinary automotive lubricating oils, these new compounds may be employed individually or may be blended with mineral lubricating oils obtained from conventional sources. When so employed, it may be desirable to include conventional additives such as anti-oxidants, color stabilizers, anti-corrode materials, dyes, and the like.

In addition to their use as lubricants, new compounds of the present invention having lower molecular weights and viscosities may also be used as hydraulic fluids. When used as such, oxidation, corrosion inhibitors, or other similar additives may be used to prepare a product suitable for the desired purpose.

While the invention has been described with reference to particular examples and embodiments thereof, it will be understood, of course, that changes, substitutions, and modifications may be made therein without departing from its scope.

The invention claimed is:

1. A synthetic lubricant having the formula $$R-O-\left[\begin{array}{c}O\\\|\\C\end{array}-R_1-\begin{array}{c}O\\\|\\C\end{array}-O-R_2-O\right]_z-\begin{array}{c}O\\\|\\C\end{array}-R_1-\begin{array}{c}O\\\|\\C\end{array}-O-R$$

wherein R is a member of the group consisting of

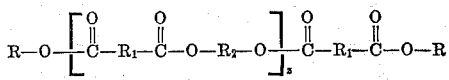 and $(CH_3)_3Si-(CH_2)_a-$ wherein $a$ is 1 or a number from 3 to 8; $R_1$ is

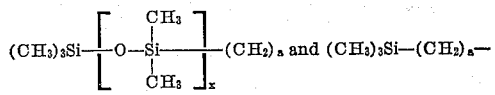

$R_2$ is a divalent radical selected from the group consisting of saturated hydrocarbon radicals having from 2 to 18 carbon atoms and ether linkage containing saturated hydrocarbon radicals having from 2 to 18 carbon atoms;

$x$ is a number from 1 to 6; $n$ is a number from 2 to 7 and $z$ is a number from 1 to 6.

2. A synthetic lubricant having the formula $$R-O-\left[\begin{array}{c}O\\\|\\C\end{array}-R_1-\begin{array}{c}O\\\|\\C\end{array}-O-R_2-O\right]_1-\begin{array}{c}O\\\|\\C\end{array}-R_1-\begin{array}{c}O\\\|\\C\end{array}-O-R$$

wherein R represents the radical

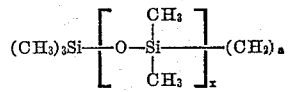

wherein $a$ is 1 or a number from 3 to 8; $R_1$ represents the radical

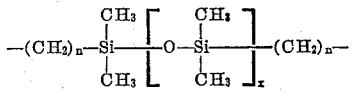

$R_2$ is a divalent hydrocarbon radical having from 2 to 18 carbon atoms, $x$ is a number from 1 to 6, and $n$ is a number from 2 to 7.

3. A synthetic lubricant according to claim 1 in which R represents the radical $$(CH_3)_3Si(CH_2)_4-$$

$R_1$ represents the radical $$-(CH_2)_2Si(CH_3)_2-O-Si(CH_3)_2-(CH_2)_2-$$

$R_2$ represents the radical $$-CH_2CH_2C(CH_3)H-$$

and $z$ is 2.

4. A synthetic lubricant according to claim 1 in which R represents the radical $$(CH_3)_3Si(CH_2)_5-$$

$R_1$ represents the radical $$-(CH_2)_2Si(CH_3)_2-O-Si-(CH_3)_2-(CH_2)_2-$$

$R_2$ represents the radical $$-(CH_2)_2-O-(CH_2)_2-$$

and $z$ is 1.

5. A synthetic lubricant according to claim 1 in which R represents the radical $$(CH_3)_3SiOSi(CH_3)_2C_3H_6-$$

$R_1$ represents the radical $$-(CH_2)_2Si(CH_3)_2[OSi(CH_3)_2]_2(CH_2)_2-$$

$R_2$ represents the radical $$-(CH_2)_2-O-(CH_2)_2-$$

and $z$ is 1.

6. A synthetic lubricant according to claim 1 in which R represents the radical $$(CH_3)_3SiOSi(CH_3)_2(CH_2)_5-$$

$R_1$ represents the radical $$-(CH_2)_2Si(CH_3)_2[OSi(CH_3)_2]_3-(CH_2)_2-$$

$R_2$ represents the radical $-(CH_2)_3-$ and $z$ is 4.

References Cited in the file of this patent

UNITED STATES PATENTS

| | | |
|---|---|---|
| 2,570,090 | Barry | Oct. 2, 1951 |
| 2,629,727 | Speier | Feb. 24, 1953 |
| 2,721,856 | Sommer | Oct. 25, 1955 |
| 2,723,987 | Speier | Nov. 15, 1955 |

OTHER REFERENCES

"Polyesters and Their Applications," by Bjorksten Research Lab. Inc., Reinhold Publ. Corp., N.Y., publisher (1956), pages 161 and 170.

UNITED STATES PATENT OFFICE

CERTIFICATE OF CORRECTION

Patent No. 2,951,861            September 6, 1960

Paul M. Kerschner et al.

It is hereby certified that error appears in the printed specification of the above numbered patent requiring correction and that the said Letters Patent should read as corrected below.

Column 4, line 42, for "(0.20)" read -- (0.20 mol) --.

Signed and sealed this 4th day of April 1961.

(SEAL)
Attest: ERNEST W. SWIDER

Attesting Officer

ARTHUR W. CROCKER
Acting Commissioner of Patents